US012647929B2

(12) United States Patent
Shah et al.

(10) Patent No.: US 12,647,929 B2
(45) Date of Patent: Jun. 2, 2026

(54) METHOD AND USER EQUIPMENT FOR LOCATION MANAGEMENT IN OFF-NETWORK

(71) Applicant: Samsung Electronics Co., Ltd., Suwon-si (KR)

(72) Inventors: Sapan Pramodkumar Shah, Bangalore (IN); Basavaraj Jayawant Pattan, Bangalore (IN); Narendranath Durga Tangudu, Bangalore (IN); Nishant Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 18/278,518

(22) PCT Filed: Feb. 23, 2022

(86) PCT No.: PCT/KR2022/002636
§ 371 (c)(1),
(2) Date: Aug. 23, 2023

(87) PCT Pub. No.: WO2022/182118
PCT Pub. Date: Sep. 1, 2022

(65) Prior Publication Data
US 2024/0137894 A1 Apr. 25, 2024
US 2024/0236914 A9 Jul. 11, 2024

(30) Foreign Application Priority Data

Feb. 23, 2021 (IN) ............................. 202141007648
Feb. 8, 2022 (IN) ............................ 2021 41007648

(51) Int. Cl.
*H04W 64/00* (2009.01)
*H04W 92/18* (2009.01)

(52) U.S. Cl.
CPC ............ *H04W 64/00* (2013.01); *H04W 92/18* (2013.01)

(58) Field of Classification Search
CPC ......... H04W 76/14; H04W 4/02; H04W 4/08; H04W 4/80; H04W 4/90; H04W 76/34;
(Continued)

(56) References Cited

U.S. PATENT DOCUMENTS 9,686,743 B2 6/2017 Lacatus et al.
10,225,693 B2 3/2019 Kodan et al.
(Continued)

FOREIGN PATENT DOCUMENTS

CN 105103628 B 6/2018
CN 105530602 B 2/2019
WO 2013/184603 A1 12/2013

OTHER PUBLICATIONS

3GPP; 3rd Generation Partnership Project; Technical Specification Group Services and System Aspects; Service Enabler Architecture Layer for Verticals (SEAL); Functional architecture and information flows; (Release 17); 3GPP TS 23.434; V17.0.0; (Dec. 2020); Dec. 18, 2020; Valbonne, France, pp. 35-49.
(Continued)

*Primary Examiner* — Ajibola A Akinyemi
(74) *Attorney, Agent, or Firm* — Jefferson IP Law, LLP

(57) ABSTRACT

The disclosure relates to a 5G or 6G communication system for supporting a higher data transmission rate. Embodiments herein provide a method for location management in off-network. The method includes sending, by a first UE (100A), a request including a configuration to a second UE (100B), where the configuration allows the second UE (100B) to report location information of the second UE (100B) to the first UE (100A) in off-network. The method includes storing, by the second UE (100B), the configuration
(Continued)

and sending a response to first UE (100A), where the first UE (100A) acknowledges to the second UE (100B) upon on receiving the response from the second UE (100B). The method includes detecting, by the second UE (100B), a trigger of a location reporting event based on the configuration, and reports the location information of the second UE (100B) to the first UE (100A) in the off-network, where the first UE (100A) acknowledges to the second UE (100B) upon receiving the location information.

15 Claims, 7 Drawing Sheets

(58) Field of Classification Search
CPC ..... H04W 8/005; H04W 88/04; H04W 92/18; H04W 24/10; H04W 36/00837; H04W 36/16; H04W 36/324; H04W 4/023; H04W 4/029; H04W 4/46; H04W 64/00
USPC ...................................................... 455/456.1
See application file for complete search history.

(56) References Cited

U.S. PATENT DOCUMENTS

| | | | | |
|---|---|---|---|---|
| 2006/0014531 | A1 | 1/2006 | Nam et al. | |
| 2015/0304982 | A1 | 10/2015 | Liao | |
| 2019/0007791 | A1 | 1/2019 | Salot et al. | |
| 2021/0410102 | A1* | 12/2021 | Manolakos | H04W 4/02 |
| 2023/0039024 | A1* | 2/2023 | Xu | H04W 4/40 |

OTHER PUBLICATIONS

3GPP; 3rd Generation Partnership Project; Technical Specification Group Services and System Aspects; Mission Critical Services Common Requirements (MCCoRe); Stage 1 (Release 17); 3GPP TS 22.280; V17.4.0; (Dec. 2020); Dec. 18, 2020; Valbonne, France.

Samsung; Off-network location management; 3GPP TSG-SA WG6 Meeting #42-bis-e; S6-211069 (was S6-210864, S6-210595); e-meeting; Apr. 12-20, 2021; Apr. 18, 2021.

Samsung; Off network Location Management—Basic Message Control and Message Format; 3GPP TSG-CT WG1 Meeting #131-e; C1-214928; was C1-214509; E-meeting; Aug. 19-27, 2021; Aug. 26, 2021.

Samsung; Off network Location Management—Event-triggered location reporting procedure; 3GPP TSG-CT WG1 Meeting #131-e C1-214929; was C1-214510; E-meeting; Aug. 19-27, 2021; Aug. 26, 2021.

Samsung; Off network Location Management—On-demand location reporting; 3GPP TSG-CT WG1 Meeting #131-e C1-214930; was C1-214511; E-meeting; 19-27; Aug. 19-27, 2021; Aug. 26, 2021.

3GPP; 3rd Generation Partnership Project; Technical Specification Group Services and System Aspects; Service Enabler Architecture Layer for Verticals (SEAL); Functional architecture and information flows; (Release 17); 3GPP TS 23.434; V17.2.0; (Jun. 2021); Jun. 25, 2021; Valbonne, France.

3GPP; 3rd Generation Partnership Project; Technical Specification Group Core Network and Terminals; Location Management—Service Enabler Architecture Layer for Verticals (SEAL); Protocol specification; (Release 17); 3GPP TS 24.545; V17.0.0; (Sep. 2021); Sep. 24, 2021; Valbonne, France.

Indian Office Action dated Oct. 13, 2022; Indian Appln. No. 202141007648.

International Search Report with Written Opinion dated May 31, 2022; International Appln. No. PCT/KR2022/002636.

Indian Notice of Hearing dated Feb. 3, 2026, issued in Indian Patent Application No. 202141007648.

\* cited by examiner

[Fig. 1]
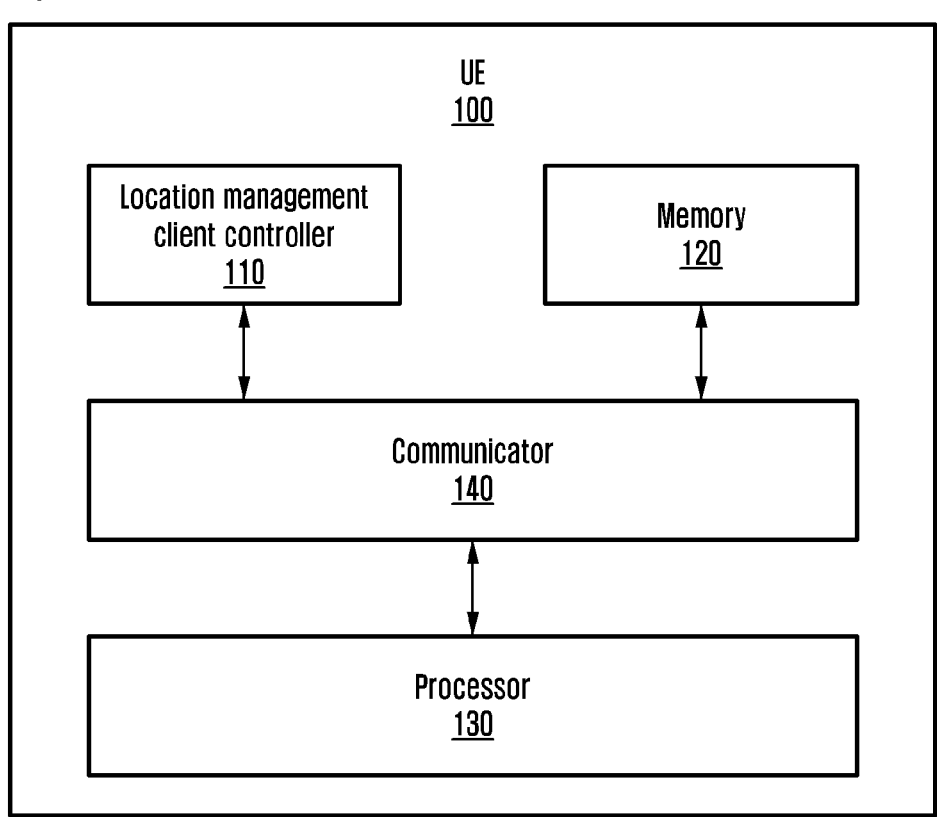

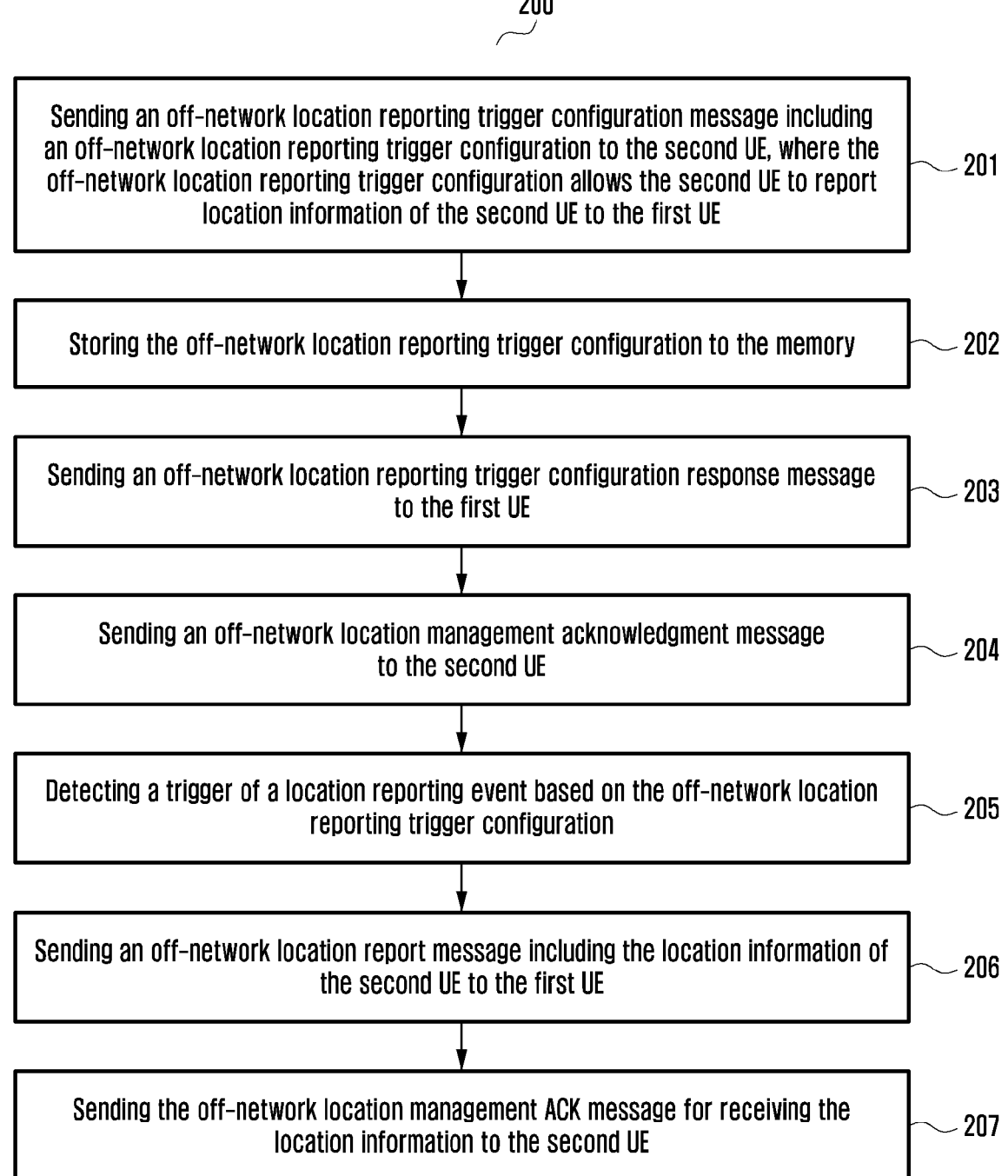

Sending an off-network location reporting trigger configuration message including an off-network location reporting trigger configuration to the second UE, where the off-network location reporting trigger configuration allows the second UE to report location information of the second UE to the first UE ~ 201

Storing the off-network location reporting trigger configuration to the memory ~ 202

Sending an off-network location reporting trigger configuration response message to the first UE ~ 203

Sending an off-network location management acknowledgment message to the second UE ~ 204

Detecting a trigger of a location reporting event based on the off-network location reporting trigger configuration ~ 205

Sending an off-network location report message including the location information of the second UE to the first UE ~ 206

Sending the off-network location management ACK message for receiving the location information to the second UE ~ 207

[Fig. 3]
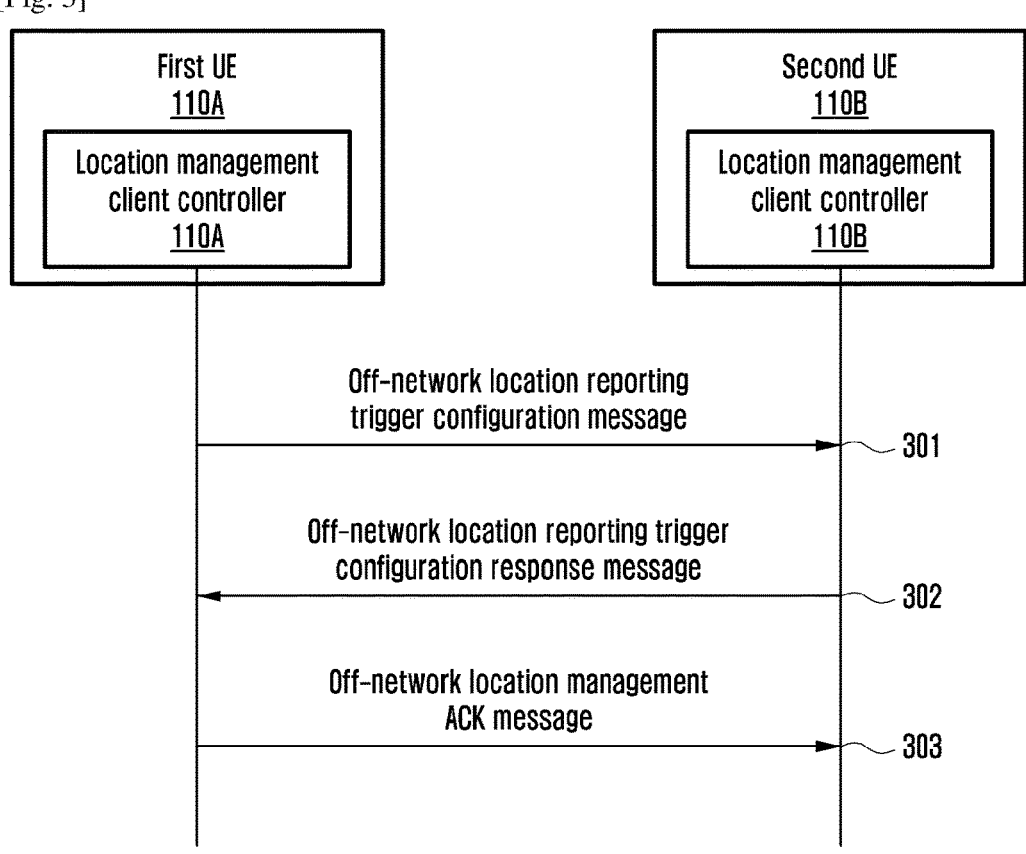
[Fig. 4]
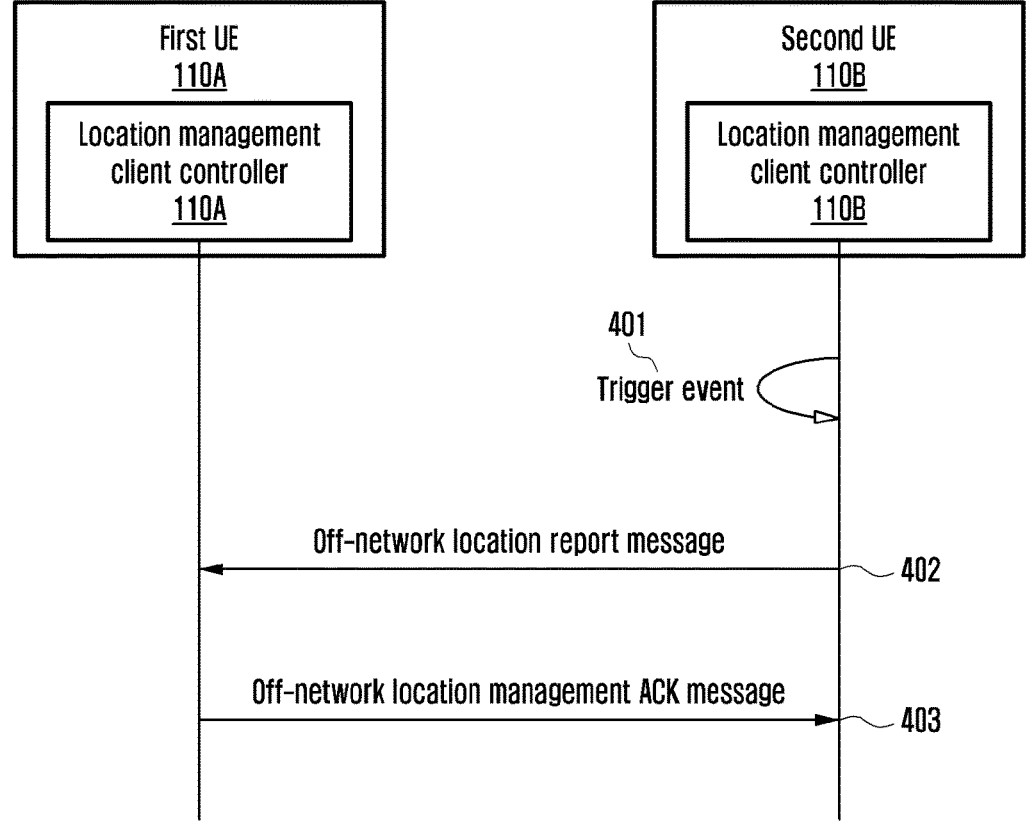

[Fig. 5]
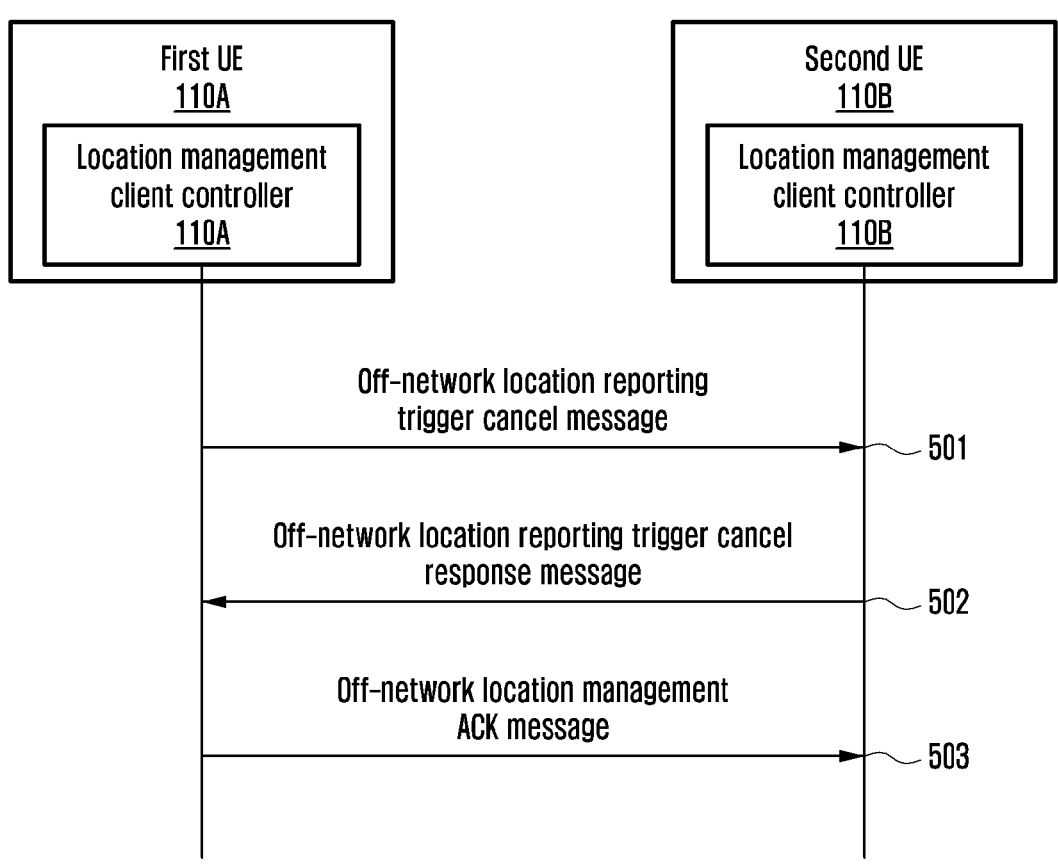

[Fig. 6]

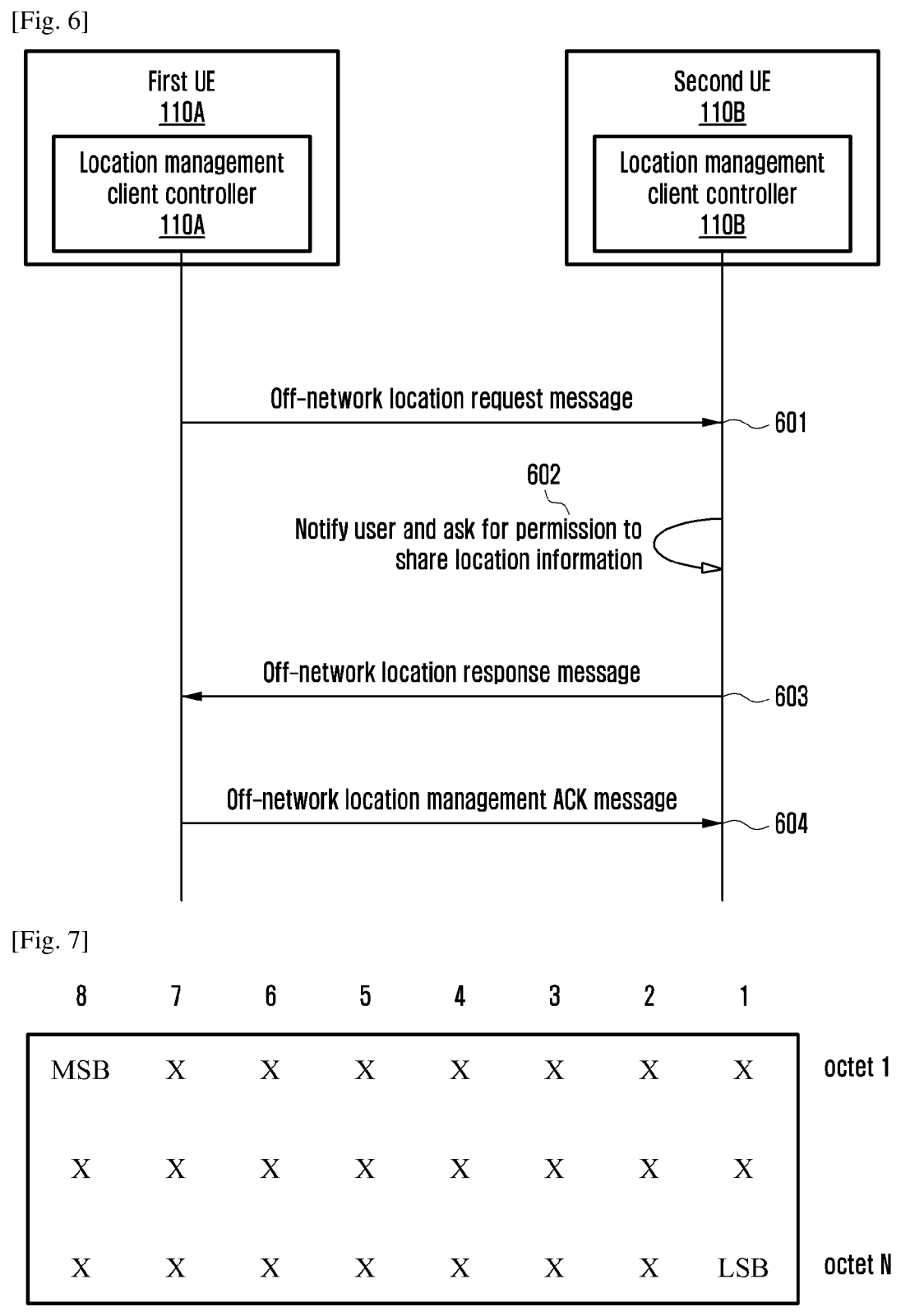

```
┌──────────────────────┐          ┌──────────────────────┐
│      First UE         │          │     Second UE        │
│       110A           │          │      110B            │
│ ┌──────────────────┐ │          │ ┌──────────────────┐ │
│ │Location management│ │          │ │Location management│ │
│ │ client controller │ │          │ │ client controller │ │
│ │      110A         │ │          │ │      110B         │ │
│ └──────────────────┘ │          │ └──────────────────┘ │
└──────────┬───────────┘          └──────────┬───────────┘
           │                                 │
           │   Off-network location request message   │
           │ ───────────────────────────────────────> │  601
           │                                 │
           │              602                │
           │        Notify user and ask for permission to │
           │           share location information  ╮
           │                                 │ ◁──╯
           │                                 │
           │   Off-network location response message  │
           │ <─────────────────────────────────────── │  603
           │                                 │
           │   Off-network location management ACK message │
           │ ───────────────────────────────────────> │  604
           │                                 │
```

[Fig. 7]

| 8 | 7 | 6 | 5 | 4 | 3 | 2 | 1 | |
|---|---|---|---|---|---|---|---|---|
| MSB | X | X | X | X | X | X | X | octet 1 |
| X | X | X | X | X | X | X | X | |
| X | X | X | X | X | X | X | LSB | octet N |

[Fig. 8]
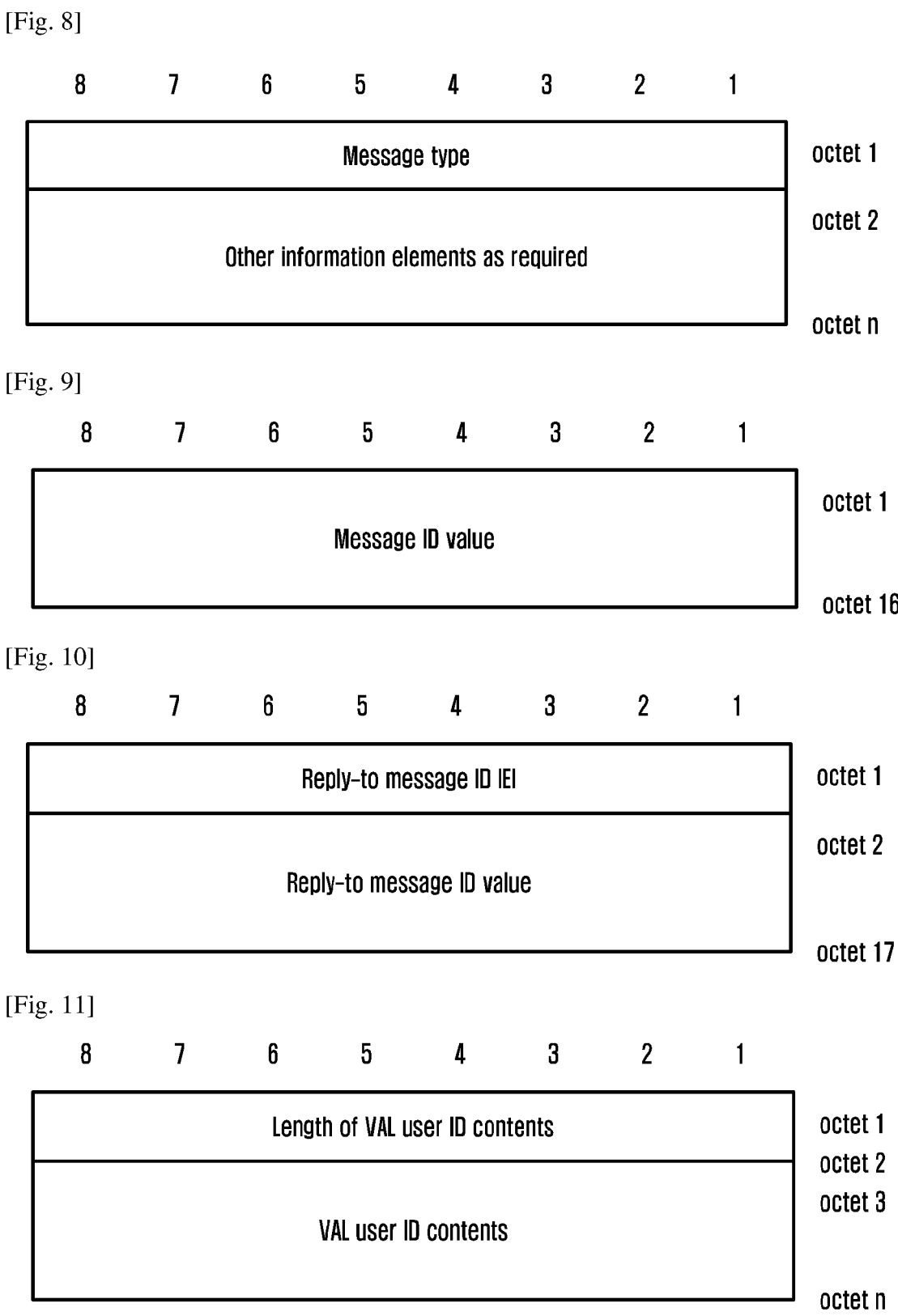
|   | 8 | 7 | 6 | 5 | 4 | 3 | 2 | 1 |   |
|---|---|---|---|---|---|---|---|---|---|
Message type — octet 1
Other information elements as required — octet 2 ... octet n
[Fig. 9]
|   | 8 | 7 | 6 | 5 | 4 | 3 | 2 | 1 |   |
|---|---|---|---|---|---|---|---|---|---|
Message ID value — octet 1 ... octet 16
[Fig. 10]
|   | 8 | 7 | 6 | 5 | 4 | 3 | 2 | 1 |   |
|---|---|---|---|---|---|---|---|---|---|
Reply-to message ID IEI — octet 1
Reply-to message ID value — octet 2 ... octet 17
[Fig. 11]
|   | 8 | 7 | 6 | 5 | 4 | 3 | 2 | 1 |   |
|---|---|---|---|---|---|---|---|---|---|
Length of VAL user ID contents — octet 1, octet 2
VAL user ID contents — octet 3 ... octet n

[Fig. 12]
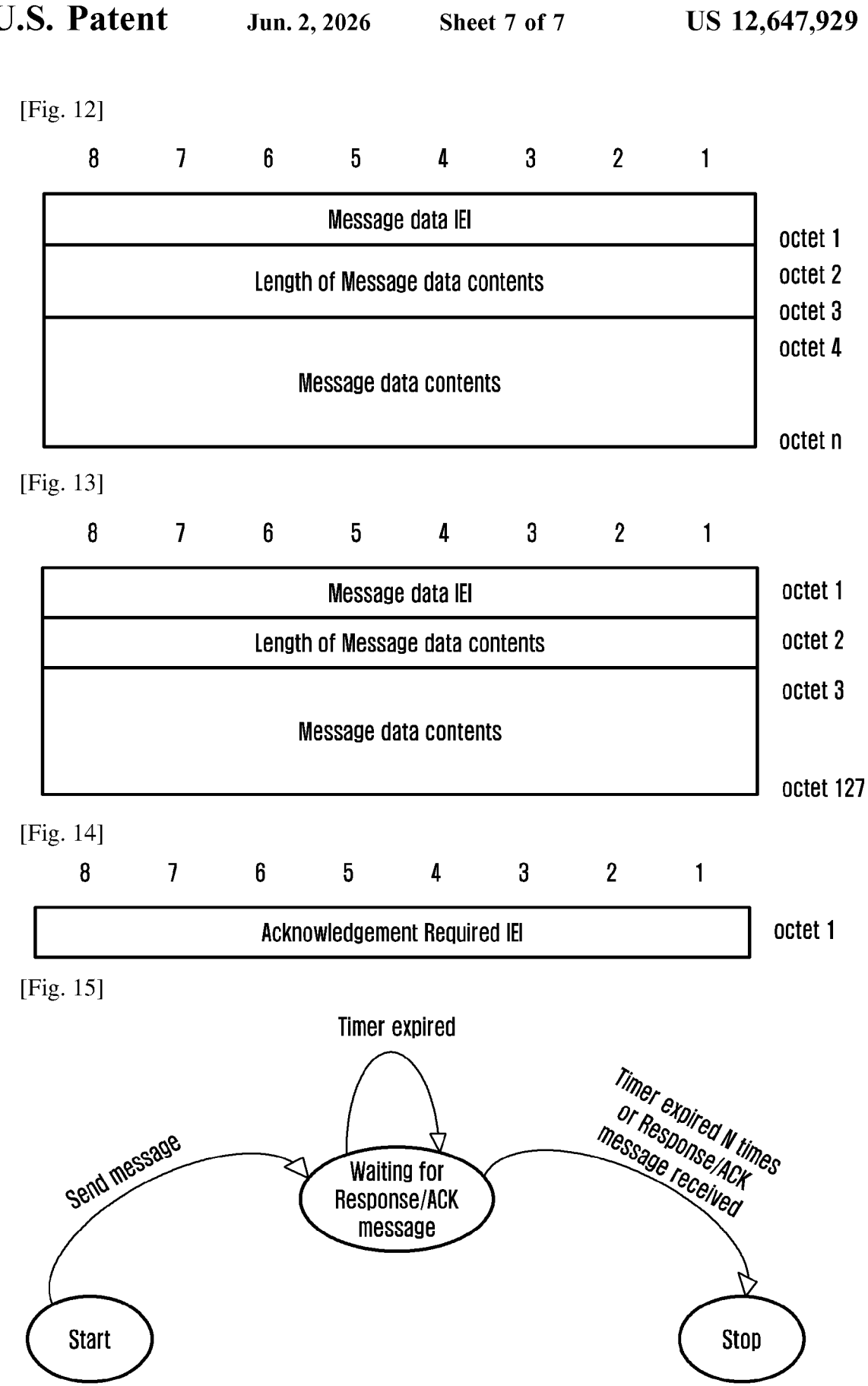
[Fig. 13]
[Fig. 14]
[Fig. 15]

METHOD AND USER EQUIPMENT FOR LOCATION MANAGEMENT IN OFF-NETWORK

TECHNICAL FIELD

The present disclosure relates to wireless communication systems, and more specifically to a method and a User Equipment (UE) for location management via off-network communication.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is un-available, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem $3^{rd}$ Generation Partnership Project (3GPP) is currently defining enabler layer support for Vehicle-to-Everything (V2X) applications. V2X devices such as cars, Road Side Units (RSU), etc. usually communicate directly with each other, instead of communicating via a network. There are many use cases in the V2X applications where one V2X device needs location information of other V2X device in order to make proper decisions.

All vehicles are required to remain updated with exact location information of other vehicles in proximity for better vehicle traffic management. The location of the V2X device (e.g. car) is most important information in the V2X applications. In road transport, knowing the location of the cars, pedestrian, traffic signals and other moving objects are crucial for safety of everyone on road. The location information of the V2X devices is heavily used in difference scenarios like intersection safety provisioning, Cooperative Lane Change (CLC) of automated vehicles, automated driving, remote driving, platoon management, etc. Many important decisions like whether to start maneuver or not, whether change lane or not, etc. are made based on the location of the other vehicles and other infrastructure within proximity of the vehicle. One of the important use cases is pre-crash sensing Warning in which the vehicles take decision to apply break based on the location of nearby vehicles in order to avoid accident.

Further, it is required to receive reliable location information among group of vehicles. As the reliable information is used to exchange the messages between leading vehicles and all cooperating vehicles, in order to execute control actions at the same time. It is important for the vehicles to remain updated with the location and other related information (like trajectory) of the surrounding vehicles. Also, it is required to manage the location of the other vehicles which are within the proximity, in order to receive continuous location reports based on different criteria. Because, it is not possible that the V2X devices remain connected to a server always. Due to very low end-to-end delay requirements, it is necessary that the V2X devices communicate with each other directly via off-network communication procedures. When devices are communicating via off-network, location management between the devices is not available due to unavailability of the network. It is required to manage location between two devices communicating directly with each other. Further, it is required to provide reliable location information of one device to another device in off-network communication. When the V2X devices are communicating via the off-network, the location management between devices is not available. Hence, it is desired to provide solution for off-network location management between the V2X devices.

Solution to Problem

Accordingly, the embodiments herein provide a method for location management in off-network. The method includes sending, by a first User Equipment (UE), an off-network location reporting trigger configuration message including an off-network location reporting trigger configuration to a second UE, where the off-network location reporting trigger configuration allows the second UE to report location information of the second UE to the first UE. The method includes receiving, by the first UE, an off-network location reporting trigger configuration response message from the second UE. The method includes sending, by the first UE, an off-network location management Acknowledgment (ACK) message to the second UE. The method includes receiving, by the first UE, an off-network location report message including the location information of the second UE from the second UE, upon triggering a location reporting event at the second UE. The method includes sending, by the first UE, the off-network location management ACK message for receiving the location information to the second UE.

In an embodiment, where the off-network location reporting trigger configuration includes an identity of the second UE or a user of the second UE, an identity of the off-network location reporting trigger configuration message, requested location information, a list of triggering criteria(s), a minimum time between consecutive reports, and a life time of the configuration, where the off-network location reporting trigger configuration response message includes a result indicates a success or a failure for an operation, an identity of the off-network location reporting trigger configuration response message, an identity of the off-network location reporting trigger configuration message, and a reason for the failure, where the off-network location management ACK message includes an identity of a previous off-network location management message received at the first UE, where the off-network location report message includes an identity of the off-network location report message, a triggering event, the location information, and an ACK requirement.

In an embodiment, where the first UE and the second UE are within a PC5 communication range of each other, and aware of a Layer-2 Identifier (ID) of each other, a Vertical Application Layer (VAL) service user of the first UE is authorized to configure a location reporting trigger to the second UE, and the VAL service user of the first UE requests to configure the location reporting triggers to the second UE.

In an embodiment, where the method includes sending, by the first UE, an off-network location reporting trigger cancel message to the second UE, where the off-network location reporting trigger cancel message allows the second UE to cancel reporting of the location information of the second UE to the first UE. The method includes receiving, by the first UE, an off-network location reporting trigger cancel response message from the second UE. The method includes sending, by the first UE, the off-network location management ACK message to the second UE for indicating that the first UE has received the off-network location reporting trigger cancel response message.

In an embodiment, where the off-network location reporting trigger cancel message includes an identity of the second UE or a user of the second UE, and an identity of the off-network location reporting trigger cancel message, where the off-network location reporting trigger cancel response message includes a result indicates a success or a failure for an operation, an identity of the off-network location reporting trigger cancel message, and an identity of the off-network location reporting trigger cancel response message.

In an embodiment, where sending, by the first UE, the off-network location management ACK message, includes generating, by the first UE, an off-network location management message by setting a message type Information Element (IE) of the off-network location management message to LOCATION MANAGEMENT ACK, an originating VAL user ID IE of the off-network location management message to its own VAL user ID, and a terminating VAL user ID IE of the off-network location management message to a VAL user ID of the target VAL user, and sending, by the first UE, the off-network location management message to the second UE.

In an embodiment, where the method includes sending, by the first UE, an off-network location request message to the second UE for immediately receiving the location information of the second UE. The method includes receiving, by the first UE, an off-network location response message including the location information of the second UE from the second UE, where the second UE obtains permission from a VAL user for sharing the location information to the first UE. The method includes sending, by the first UE, the off-network location management ACK message to the second UE.

In an embodiment, where the off-network location request message is sent based on a configuration including a periodical location information timer stored at the first UE.

In an embodiment, where the off-network location request message includes an identity of the second UE or a user of the second UE, an identity of the off-network location request message, and requested location information, where the off-network location response message includes a result indicates a success or a failure for an operation, an identity of the off-network location response message, an identity of the off-network location request message, and the location information.

In an embodiment, where the first UE and the second UE are within a PC5 communication range of each other, and aware of a Layer-2 ID of each other, a VAL service user of the first UE is authorized to request the second UE for location reporting, and the VAL service user of the first UE requests immediate location reporting to the second UE.

In an embodiment, where the message type information element is used to identify a request or a response or an acknowledgement. The message type is the off-network location management message, and the message type indicates a direction of sending the off-network location management message from one UE to other UE. A value part of the message type information element of the off-network location reporting trigger configuration request message is 00000001 (numeric number 1), the off-network location reporting trigger configuration response message is 00000010 (numeric number 2), the off-network location management ACK message is 00000011 (numeric number 3), an off-network location report message is 00000100 (numeric number 4), an off-network location reporting trigger cancel message is 00000101 (numeric number 5), an off-network location reporting trigger cancel response message is 00000110 (numeric number 6), an off-network location request message is 00000111 (numeric number 7), and an off-network location response message is 00001000 (numeric number 8).

In an embodiment, where the method includes setting, by the first UE, a current value of a counter and a maximum value of the counter. The method includes initiating, by the first UE, a timer. The method includes sending, by the first UE, a request message to the second UE and waiting for receiving a response message from the second UE till an expiry of the counter and the timer. The method includes performing, by the first UE, one of: receiving the response message within the expiry of the counter and the timer, terminating the counter and the timer upon receiving the response message, and determining that the request message is successfully delivered at the second UE, and not receiving the response message within the expiry of the counter and the timer, terminating the counter and the timer upon detecting the expiry of the counter and the timer, and determining that the request message is failed to deliver at the second UE.

In an embodiment, where the expiry of the counter and the timer is determined by detecting that the timer is expired, incrementing the current value of the counter for each expiry of the timer, restarting the timer upon incrementing the current value of the counter, and detecting that the counter is expired upon detecting that the current value of the counter equal to or greater than the maximum value.

Accordingly, the embodiments herein provide a method for the location management in the off-network. The method includes receiving, by the second UE, the off-network location reporting trigger configuration message including the off-network location reporting trigger configuration from the first UE, where the off-network location reporting trigger configuration allows the second UE to report location information of the second UE to the first UE. The method includes storing, by the second UE, the off-network location reporting trigger configuration to the memory. The method includes sending, by the second UE, the off-network location reporting trigger configuration response message to the first UE. The method includes receiving, by the second UE, the off-network location management ACK message from the first UE. The method includes detecting, by the second UE, a trigger of a location reporting event based on the off-network location reporting trigger configuration. The method includes sending, by the second UE, the off-network location report message including the location information of the second UE to the first UE. The method includes receiving, by the second UE, the off-network location management ACK message from the first UE.

In an embodiment, where the second UE stores an initial location reporting event triggers configuration while receiving the off-network location reporting trigger configuration message.

In an embodiment, where the method includes receiving, by the second UE, the off-network location reporting trigger cancel message from the first UE, where the off-network location reporting trigger cancel message allows the second UE to cancel reporting of the location information of the second UE to the first UE. The method includes deleting, by the second UE, the off-network location reporting trigger configuration from the memory. The method includes sending, by the second UE, the off-network location reporting trigger cancel response message to the first UE. The method includes receiving, by the second UE, the off-network location management ACK message from the first UE.

In an embodiment, where the method, includes receiving, by the second UE, the off-network location request message from the first UE for immediately sending the location information of the second UE. The method includes obtaining, by the second UE, permission from a VAL user for sharing the location information of the second UE to the first UE. The method includes sending, by the second UE, the off-network location response message including the location information of the second UE to the first UE. The method includes receiving, by the second UE, the off-network location management ACK message from the first UE.

In an embodiment, where the method includes setting, by the second UE, a current value of a counter and a maximum value of a counter. The method includes initiating, by the second UE, a timer. The method includes sending, by the second UE, a response message to the first UE and waiting for receiving an ACK message from the first UE till the expiry of the counter and the timer. The method includes performing, by the second UE, one of: receiving the ACK message within the expiry of the counter and the timer, terminating the counter and the timer upon receiving the ACK message, and determining that the response message is successfully delivered at the first UE, and not receiving the ACK message within the expiry of the counter and the timer, terminating the counter and the timer upon detecting the expiry of the counter and the timer, and determining that the response message is failed to deliver at the first UE.

Accordingly, the embodiments herein provide the first UE for the location management in off-network. The first UE includes a location management client controller, a memory, a processor, where the location management client controller is coupled to the memory and the processor. The location management client controller is configured for sending the off-network location reporting trigger configuration message including the off-network location reporting trigger configuration to the second UE, where the off-network location reporting trigger configuration allows the second UE to report location information of the second UE to the first UE. The location management client controller is configured for receiving the off-network location reporting trigger configuration response message from the second UE. The location management client controller is configured for sending the off-network location management ACK message to the second UE. The location management client controller is configured for receiving the off-network location report message including the location information of the second UE from the second UE, upon triggering the location reporting event at the second UE. The location management client controller is configured for sending the off-network location management ACK message for receiving the location information to the second UE.

Accordingly, the embodiments herein provide the second UE for the location management in the off-network. The second UE includes a location management client controller, a memory, a processor, where the location management client controller is coupled to the memory and the processor. The location management client controller is configured for receiving the off-network location reporting trigger configuration message including the off-network location reporting trigger configuration from the first UE, where the off-network location reporting trigger configuration allows the second UE to report location information of the second UE to the first UE. The location management client controller is configured for storing the off-network location reporting trigger configuration to the memory (120B). The location management client controller is configured for sending the off-network location reporting trigger configuration response message to the first UE. The location management client controller is configured for receiving the off-network location management ACK message from the first UE. The location management client controller is configured for detecting the trigger of the location reporting event based on the off-network location reporting trigger configuration. The location management client controller is configured for sending the off-network location report message including the location information of the second UE to the first UE. The location management client controller is configured for receiving the off-network location management ACK message from the first UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

Advantageous Effects of Invention

The principal object of the embodiments herein is to provide a method and a UE for location management in off-network.

Another object of the embodiments herein is to configure an off-network location reporting trigger configuration at a second UE for obtaining the location information of the second UE by a first UE until a time defined in the configuration.

Another object of the embodiments herein is to cancel reporting of the location information of the second UE upon receiving a request from the first UE by the second UE.

Another object of the embodiments herein is to provide the location information of the second UE to the first UE based on an on-demand request received from the first UE.

Another object of the embodiments herein is to set a timer to decide a success or failure of sending a message between UEs.

Another object of the embodiments herein is to define encoding of different off-network location management messages.

BRIEF DESCRIPTION OF DRAWINGS

The method and the UE are illustrated in the accompanying drawings, throughout which like reference letters indicate corresponding parts in the various figures. The embodiments herein will be better understood from the following description with reference to the drawings, in which:

FIG. 1 is a block diagram of a UE for location management in off-network, according to an embodiment as disclosed herein;

FIG. 2 is a flow diagram illustrating a method for the location management in the off-network, according to an embodiment as disclosed herein;

FIG. 3 is a sequential diagram illustrating signaling between a first UE and a second UE for configuring the second UE for reporting location information of the second UE to the first UE, according to the embodiments as disclosed herein;

FIG. 4 is a sequential diagram illustrating reporting of the location information to the first UE by the second UE, according to the embodiments as disclosed herein;

FIG. 5 is a sequential diagram illustrating signaling between the first UE and the second UE for cancelling reporting of the location information of the second UE to the first UE, according to the embodiments as disclosed herein;

FIG. 6 is a sequential diagram illustrating signaling between the first UE and the second UE for on-demand reporting of the location information of the second UE to the first UE, according to the embodiments as disclosed herein;

FIG. 7 illustrates an example of a field, according to the embodiments as disclosed herein;

FIG. 8 illustrates an organization of a signaling message, according to the embodiments as disclosed herein;

FIG. 9 illustrates a coded message ID information element, according to the embodiments as disclosed herein;

FIG. 10 illustrates a coded Reply-to message ID information element, according to the embodiments as disclosed herein;

FIG. 11 illustrates a coded VAL user ID information element, according to the embodiments as disclosed herein;

FIG. 12 illustrates a coded message data information element, according to the embodiments as disclosed herein;

FIG. 13 illustrates a coded cause element, according to the embodiments as disclosed herein;

FIG. 14 illustrates a coded acknowledgement required, according to the embodiments as disclosed herein; and FIG. 15 illustrates a method of setting a timer to decide a success or failure of sending a message between UEs, according to the embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "first UE" and "UE-1" are used interchangeably and mean the same, the terms "second UE" and "UE-2" are used interchangeably and mean the same, the terms "UE" and "VAL UE" are used interchangeably and mean the same, the terms "location management client" and "location management client controller" are used interchangeably and mean the same.

Embodiments herein provide a method for location management in off-network. The method includes sending, by a first UE, a request (i.e. an off-network location reporting trigger configuration message) including a configuration (i.e. an off-network location reporting trigger configuration) to a second UE, where the configuration allows the second UE to report location information of the second UE to the first UE in the off-network. The method includes storing, by the second UE, the configuration and sending a response (i.e. an off-network location reporting trigger configuration response message) to the first UE. The method includes sending, by the first UE, an off-network location management Acknowledgment (ACK) message to the second UE upon receiving the response from the second UE. The method includes detecting, by the second UE, a trigger of a location reporting event based on the configuration. Further, the method includes sending, by the second UE, an off-network location report message comprising the location information of the second UE to the first UE in the off-network. The method includes sending, by the first UE, the off-network location management ACK message to the second UE upon receiving the off-network location report message.

Receiving reliable location of a nearby vehicles is an important aspects in V2X use cases. It is even more challenging to get and manage location information of the nearby vehicles in off-network communication. The proposed method includes managing the location information in the off-network communication by allowing the first UE to configure triggers to the second UE, to cancel the configuration, to send location report based on the triggers and on-demand request for the location information from the second UE. Further, the proposed method includes encoding of the different off-network location management messages allowing both the UEs to parse and understand messages and reply accordingly.

Referring now to the drawings, and more particularly to FIGS. 1 through 15, there are shown preferred embodiments.

FIG. 1 is a block diagram of a UE (100) for location management in off-network, according to an embodiment as disclosed herein. Examples of the UE (100) include, but are not limited to a smartphone, a tablet computer, a Personal Digital Assistance (PDA), a desktop computer, an Internet of Things (IoT), a wearable device, etc. In an embodiment, the UE (100) includes a location management client controller (110), a memory (120), a processor (130), and a communicator (140). The location management client controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The memory (120) stores an initial location reporting event triggers configuration, and a configuration including a periodical location information timer. The memory (120) stores an off-network location reporting trigger configuration upon receiving an off-network location reporting trigger configuration message. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the UE (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the UE (100). Further, the communicator (140) is configured to facilitate the communication between the UE (100) and other devices via one or more networks (e.g. Radio technology). The communicator (140) includes an electronic circuit specific to a standard that enables wired or wireless communication.

In an embodiment, a first UE (100A) and a second UE (100B) are communicating using a V2X technology within a PC5 communication range of each other, and aware of a Layer-2 Identifier (ID) of each other. A Vertical Application Layer (VAL) service user of the first UE (100A) is authorized to configure a location reporting trigger to the second UE (100B). The VAL service user of the first UE (100A) requests to configure the location reporting triggers to the second UE (100B). Both the first UE (100A) and the second UE (100B) has same architecture of the UE (100), whereas functions of a location management client controller (110A) of the first UE (100A) and a location management client controller (110B) of the second UE (100B) are different and the functions are described below.

The location management client controller (110A) sends an off-network location reporting trigger configuration message including an off-network location reporting trigger configuration to the second UE (100B), where the off-network location reporting trigger configuration allows the second UE (100B) to report location information of the second UE (100B) to the first UE (100A). In an embodiment, the off-network location reporting trigger configuration includes an identity of the second UE (100B) or a user of the second UE (100B), an identity of the off-network location reporting trigger configuration message, requested location information, a list of triggering criteria(s), a minimum time between consecutive reports, and a life time of the configuration. Upon receiving the off-network location reporting trigger configuration message by the second UE (100B), the location management client controller (110B) stores the off-network location reporting trigger configuration to the memory (120B). In an embodiment, the location management client controller (110B) stores the initial location reporting event triggers configuration while receiving the off-network location reporting trigger configuration message.

Further, the location management client controller (110B) sends an off-network location reporting trigger configuration response message to the first UE (100A). In an embodiment, the off-network location reporting trigger configuration response message includes a result indicates a success or a failure for an operation, an identity of the off-network location reporting trigger configuration response message, an identity of the off-network location reporting trigger configuration message, and a reason for the failure. Upon receiving the off-network location reporting trigger configuration response message by the first UE (100A), the location management client controller (110A) sends the off-network location management ACK message to the second UE (100B). In an embodiment, the off-network location management ACK message includes an identity of a previous off-network location management message received at the first UE (100A). The location management client controller (110B) receives the off-network location management ACK message.

In an embodiment, the location management client controller (110A) generates an off-network location management message by setting a message type Information Element (IE) of the off-network location management message to LOCATION MANAGEMENT ACK, an originating VAL user ID IE of the off-network location management message to its own VAL user ID, and a terminating VAL user ID IE of the off-network location management message to a VAL user ID of the target VAL user. Further, the location management client controller (110A) sends the off-network location management message to the second UE (100B) for acknowledging to the second UE (100B).

The location management client controller (110B) detects a trigger of a location reporting event based on the off-network location reporting trigger configuration. Further, the location management client controller (110B) sends an off-network location report message including the location information of the second UE (100B) to the first UE (100A). In an embodiment, the off-network location report message includes an identity of the off-network location report message, a triggering event, the location information, and an ACK requirement. Upon receiving the off-network location report message by the first UE (100A), the location management client controller (110A) sends the off-network location management ACK message to the second UE (100B).

In an embodiment, after configuring the second UE (100B) for sharing the location information, the location management client controller (110A) can send an off-network location reporting trigger cancel message to the second UE (100B), where the off-network location reporting trigger cancel message allows the second UE (100B) to cancel reporting of the location information of the second UE (100B) to the first UE (100A). In an embodiment, the off-network location reporting trigger cancel message includes an identity of the second UE (100B) or a user of the second UE (100B), and an identity of the off-network location reporting trigger cancel message. Upon receiving the off-network location reporting trigger cancel message by the second UE (100B), the location management client controller (110B) deletes the off-network location reporting trigger configuration from the memory (120B). Further, the location management client controller (110B) sends an off-network location reporting trigger cancel response message to the first UE (100A). In an embodiment, the off-network location reporting trigger cancel response message includes a result indicates a success or a failure for an operation, an identity of the off-network location reporting trigger cancel message, and an identity of the off-network location reporting trigger cancel response message. Upon receiving the off-network location reporting trigger cancel response message by the first UE (100A), the location management client controller (110A) sends the off-network location management ACK message to the second UE (100B) for indicating that the first UE (100A) has received the off-network location reporting trigger cancel response message.

In another embodiment, the first UE (100A) and the second UE (100B) are communicating using the V2X technology within the PC5 communication range of each other, and aware of the Layer-2 ID of each other. The VAL service user of the first UE (100A) is authorized to request the second UE (100B) for location reporting. The VAL service user of the first UE (100A) requests for immediate location reporting to the second UE (100B). Both the first UE (100A)

and the second UE (100B) has same architecture of the UE (100), whereas the functions of the location management client controller (110A) of the first UE (100A) and the location management client controller (110B) of the second UE (100B) are different and the functions are described below.

The location management client controller (110A) sends an off-network location request message to the second UE (100B) for immediately receiving the location information of the second UE (100B). In an embodiment, the off-network location request message includes an identity of the second UE (100B) or a user of the second UE (100B), an identity of the off-network location request message, and requested location information. In an embodiment, the off-network location request message is sent based on a configuration including a periodical location information timer stored at the first UE (100A). Upon receiving the off-network location response message, the location management client controller (110B) obtains permission from the VAL user for sharing the location information of the second UE (100B) to the first UE (100A).

Further, the location management client controller (110B) sends the off-network location response message including the location information of the second UE (100B) to the first UE (100A). In an embodiment, the off-network location response message includes a result indicates a success or a failure for an operation, an identity of the off-network location response message, an identity of the off-network location request message, and the location information. Upon receiving the off-network location response message by the first UE (100A), the location management client controller (110A) sends the off-network location management ACK message to the second UE (100B).

In an embodiment, the location management client controller (110A) sets a current value of a counter and a maximum value of the counter. Further, the location management client controller (110A) initiates a timer. Further, the location management client controller (110A) sends the request message (i.e. the off-network location reporting trigger configuration request message, the off-network location reporting trigger cancel message, and the off-network location request message) to the second UE (100B) and waits to receive the response message (i.e. the off-network location reporting trigger configuration response message, the off-network location report message, the off-network location reporting trigger cancel response message, and the off-network location response message) from the second UE (100B) till an expiry of the counter and the timer.

Upon receiving the response message within the expiry of the counter and the timer, the location management client controller (110A) terminates the counter and the timer, and determines that the request message is successfully delivered at the second UE (100B). Upon not receiving the response message within the expiry of the counter and the timer, the location management client controller (110A) terminates the counter and the timer at the expiry of the counter and the timer, and determines that the request message is failed to deliver at the second UE (100B).

In an embodiment, the location management client controller (110B) sets the current value of the counter and the maximum value of the counter. Further, the location management client controller (110B) initiates the timer. Further, the location management client controller (110B) sends the response message to the first UE (100A) and waiting for receiving the ACK message (i.e. the off-network location management ACK message) from the first UE (100A) till the expiry of the counter and the timer. Upon receiving the ACK message within the expiry of the counter and the timer, the location management client controller (110B) terminates the counter and the timer, and determines that the response message is successfully delivered at the first UE (100A). Upon not receiving the ACK message within the expiry of the counter and the timer, the location management client controller (110B) terminates the counter and the timer at the expiry of the counter and the timer, and determines that the response message is failed to deliver at the first UE (100A).

In an embodiment, upon detecting that the timer is expired, the location management client controller (110A, 110B) increments the current value of the counter for each expiry of the timer. Further, the location management client controller (110A, 110B) restarts the timer upon incrementing the current value of the counter. Further, the location management client controller (110A, 110B) detects that the counter is expired upon detecting that the current value of the counter is equal to or greater than the maximum value.

In an embodiment, a value part of the message type information element of the off-network location reporting trigger configuration request message is 00000001 (numeric number 1), the off-network location reporting trigger configuration response message is 00000010 (numeric number 2), the off-network location management ACK message is 00000011 (numeric number 3), an off-network location report message is 00000100 (numeric number 4), an off-network location reporting trigger cancel message is 00000101 (numeric number 5), an off-network location reporting trigger cancel response message is 00000110 (numeric number 6), an off-network location request message is 00000111 (numeric number 7), and an off-network location response message is 00001000 (numeric number 8).

Although the FIG. 1 shows the hardware components of the UE (100) but it is to be understood that other embodiments are not limited thereon. In other embodiments, the UE (100) may include less or a greater number of components. Further, the labels or names of the components are used only for illustrative purpose and does not limit the scope of the invention. One or more components can be combined together to perform same or substantially similar function for the location management in off-network.

FIG. 2 is a flow diagram (200) illustrating a method for the location management in off-network, according to an embodiment as disclosed herein. In an embodiment, the method allows the location management client controller (110A) to perform steps 201, 204, 207 of the flow diagram (200). In an embodiment, the method allows the location management client controller (110B) to perform steps 202, 203, 205, 206 of the flow diagram (200). At step 201, the method includes sending the off-network location reporting trigger configuration message including the off-network location reporting trigger configuration to the second UE, where the off-network location reporting trigger configuration allows the second UE to report location information of the second UE to the first UE. At step 202, the method includes storing the off-network location reporting trigger configuration to the memory (120B).

At step 203, the method includes sending the off-network location reporting trigger configuration response message to the first UE. At step 204, the method includes sending the off-network location management acknowledgment message to the second UE upon receiving the off-network location reporting trigger configuration response message. At step 205, the method includes detecting the trigger of the location reporting event based on the off-network location reporting trigger configuration. At step 206, the method includes sending the off-network location report message including the location information of the second UE to the first UE. At step 207, the method includes sending the off-network location management ACK message for receiving the location information to the second UE.

The various actions, acts, blocks, steps, or the like in the flow diagram (200) may be performed in the order presented, in a different order, or simultaneously. Further, in some embodiments, some of the actions, acts, blocks, steps, or the like may be omitted, added, modified, skipped, or the like without departing from the scope of the invention.

FIG. 3 is a sequential diagram illustrating signaling between a first UE and a second UE for configuring the second UE for reporting location information of the second UE to the first UE, according to the embodiments as disclosed herein. The FIG. 3 illustrates the proposed procedure of configuring a location reporting trigger from the location management client controller (110A) residing in the UE-1 (100A) to the location management client controller (110B) residing in the UE-2 (100B). Consider, the UE-1 (100A) and the UE-2 (100B) are within the PC5 communication range of each other, and aware of the Layer-2 ID of each other. The VAL service user of the UE-1 (100A) is authorized to configure the location reporting trigger to the UE-2 (100B). The VAL service user of the UE-1 (100A) requests to configure the location reporting trigger to the UE-2 (100B).

At 301, the location management client controller (110A) of the UE-1 (100A) sends the off-network location reporting trigger configuration message to the location management client controller (110B) of the UE-2 (100B) containing the initial location reporting event triggers configuration or a subsequent update for reporting the location of the VAL UE (100B). The off-network location reporting trigger configuration message includes information elements as specified in table 1.

TABLE 1

| Information element | Status | Description |
|---|---|---|
| Identity | M | Identity of the VAL user to which the location reporting configuration is targeted or identity of the VAL UE. |
| Message ID | M | Identity of the message; unique between pair of location management client controllers. |
| Requested location information | M | Identifies what location information is requested |
| List of triggering criteria(s) | M | One or more triggering criteria that identifies when the location management client controller will send the location report. Each triggering criteria is identified by trigger-id. |
| Minimum time between consecutive reports | O | Defaults to 0 if absent otherwise indicates the time interval between consecutive reports |
| Life time of the configuration | O | Time till when location report configurations are valid. |

At 302, the location management client controller (110B) stores the location reporting configuration, and sends the off-network location reporting trigger configuration response message to the location management client controller (110A). The off-network location reporting trigger configuration response message acts as an acknowledgement to the location management client controller (110A).

The off-network location reporting trigger configuration response message includes information elements as specified in table 2.

TABLE 2

| Information element | Status | Description |
|---|---|---|
| Result | M | Indicates the success or failure for the operation |
| Message ID | M | Identity of this message; unique between pair of location management client controllers. |
| Reply-to Message ID | M | Identity of the request message for which this response message is sent |
| Cause | O | Provides reason for the failure. |

At 303, upon receiving the off-network location reporting trigger configuration response message, the location management client controller (110A) sends the off-network location management ACK message to the location management client controller (110B). The off-network location management ACK message includes information elements as specified in table 3.

TABLE 3

| Information element | Status | Description |
|---|---|---|
| Message ID | M | Identity of the message for which this acknowledgement is sent |

In an embodiment, the device (100B) sending the off-network location reporting trigger configuration response message may indicate to avoid sending acknowledgement for this response message. In another embodiment, sending the acknowledgement to the response message is optional.

Protocol aspects of the originating client (i.e. UE-1 (100A)) is as follows. Upon receiving the request from the VAL user to configure the off-network location information trigger to another VAL user, a Service enabler architecture layer off-network Location management client controller (SLM-C) generates the off-network location management message. In the off-network location management message, the SLM-C sets the message type IE to "LOCATION REPORTING TRIGGER CONFIGURATION REQUEST", sets the originating VAL user ID IE to its own VAL user ID, sets the terminating VAL user ID IE to the VAL user ID the target VAL user, sets the message ID IE to the unique identify of this message, generates an application/vnd.3gpp.seal-location-info+xml MIME body.

In the <location-info> root element, the SLM-C adds location reporting elements which are requested, a <triggering-criteria> child element which indicate a specified location trigger criteria to send the location report, a <minimum-interval-length> child element specifying the minimum time in seconds between consecutive reports. The SLM-C sets the location management data IE to the application/vnd.3gpp.seal-location-info+xml MIME body, and sends the message as specified in sending message scenario. Upon reception of the off-network location management message containing the message type IE set to "LOCATION REPORTING TRIGGER CONFIGURATION RESPONSE", the SLM-C sends the acknowledgement message as specified in scenario of sending acknowledgement.

Protocol aspects of the terminating client (i.e. UE-2 (100B)) is as follows. Upon reception of the off-network location management message containing the message type IE set to "LOCATION REPORTING TRIGGER CONFIGURATION REQUEST", the SLM-C stores the content of the <configuration> elements, sets the location reporting triggers accordingly, starts the minimum-report-interval timer, generates the off-network location management message. In the off-network location management message, the SLM-C sets the message type IE to "LOCATION REPORTING TRIGGER CONFIGURATION RESPONSE", sets the originating VAL user ID IE to its own VAL user ID, sets the terminating VAL user ID IE to the VAL user ID the originating VAL user, sets the message ID IE to the unique identify of this message, sets the Reply-to Message ID IE to the value of the message ID IE of the received message, and sends the message as specified in scenario of sending a message.

FIG. 4 is a sequential diagram illustrating reporting of the location information to the first UE by the second UE, according to the embodiments as disclosed herein. The FIG. 4 illustrates the proposed procedure of sending the off-network location report from the location management client controller (110B) residing in the UE-2 (100B) to the location management client controller (110A) residing in the UE-1 (100A). Consider, the UE-1 (100A) and the UE-2 (100B) are within the PC5 communication range of each other, and aware of Layer-2 ID of each other. The location management client controller (110A) has previously configured the off-network location reporting trigger to the location management client controller (110B) as specified in the location reporting trigger configuration.

At 401, the location management client controller (110B) is monitoring the location reporting trigger and one of the events is occurred. At 402, the location management client controller (110B) sends the off-network location report message. The off-network location report message includes information elements as specified in table 4.

TABLE 4

| Information element | Status | Description |
|---|---|---|
| Message ID | M | Identity of the message; unique between pair of location management client controllers. |
| Triggering event | M | Identity of the event that triggered the sending of the report |
| Location information | M | Location information |

At 403, upon receiving the off-network location report message, the location management client controller (110A) sends the off-network location management ACK message to the location management client controller (110B). The off-network location management ACK message includes information elements as specified in the table 3.

In an embodiment, the device (100B) sending the off-network location report may indicate to avoid sending the acknowledgement for this reporting message. In another embodiment, sending the acknowledgement to the reporting message is optional.

Protocol aspects of the originating client (i.e. UE-1 (100A)) is as follows. In order to report the off-network location information, the SLM-C generates the off-network location management message. In the off-network location management message, the SLM-C sets the message type IE to "LOCATION REPORT", sets the originating VAL user ID IE to its own VAL user ID, sets the terminating VAL user ID IE to the VAL user ID the target VAL user, sets the message ID IE to the unique identify of this message, generates an application/vnd.3gpp.seal-location-info+xml MIME body. In the <location-info> root element, the SLM-C adds a <report> element and, if the report was triggered by a location request, then adds the <report-id> attribute set to the value of the <request-id> attribute in the received request. In the <report> element, the SLM-C adds a <trigger-id> child element set to the value of each <trigger-id> value of the triggers that have been met, and adds the location reporting elements corresponding to the triggers that have been met. The SLM-C set a location management data IE to the application/vnd.3gpp.seal-location-info+xml MIME body, sends the message as specified in scenario of sending message, sets the minimum-report-interval timer to the minimum-report-interval time and start this timer, and resets all the trigger criteria for location reporting.

Protocol aspects of the terminating client (i.e. UE-2 (100B)) is as follows. Upon reception of the off-network location management message containing the message type IE set to "LOCATION REPORT", the SLM-C sends the acknowledgement message as specified in scenario of sending acknowledgement, stores the received location information of the reporting SLM-C, and uses the location information as needed.

FIG. 5 is a sequential diagram illustrating signaling between the first UE and the second UE for cancelling reporting of the location information of the second UE to the first UE, according to the embodiments as disclosed herein. The FIG. 5 illustrates the proposed procedure for sending the off-network location reporting trigger cancel from the location management client controller (110A) residing in the UE-1 (100A) to the location management client controller (110B) residing in UE-2 (100B). Consider, the UE-1 (100A) and the UE-2 (100B) are within the PC5 communication range of each other, and aware of Layer-2 ID of each other. The location management client controller (110A) has previously configured the location reporting trigger to the location management client controller (110B) as specified in location reporting trigger configuration.

At 501, the location management client controller (110A) in the UE-1 (100A) sends the off-network location reporting trigger cancel message to the location management client controller (110B) in the UE-2 (100B) to cancel the location reporting trigger configuration. The off-network location reporting trigger cancel message includes information elements as specified in table 5.

TABLE 5

| Information element | Status | Description |
|---|---|---|
| Identity | M | Identity of the VAL user to which the location reporting trigger cancel is targeted or identity of the VAL UE. |
| Message ID | M | Identity of the message; unique between pair of location management client controllers. |

At 502, The location management client controller (110B) clears the location reporting configuration, and sends the off-network location reporting trigger cancel response to the location management client controller (110A). The off-network location reporting trigger cancel response includes information elements as specified in table 6.

TABLE 6

| Information element | Status | Description |
|---|---|---|
| Result | M | Indicates the success or failure for the operation |
| Message ID | M | Identity of this message; unique between pair of location management client controllers. |
| Reply-to Message ID | M | Identity of the request message for which this response message is sent |

At 503, upon receiving the off-network location reporting trigger cancel response, the location management client controller (110A) sends the off-network location management ACK message. The off-network location reporting trigger ACK message includes information elements as specified in the table 3. The off-network location reporting trigger cancel response acts as an acknowledgement to the location management client controller (110A).

In an embodiment, the device (100B) sending the off-network location reporting trigger cancel response may indicate to avoid sending the acknowledgement for the off-network location reporting trigger cancel response. In another embodiment, sending the acknowledgement to the response message is optional.

Protocol aspects of the originating client (i.e. UE-1 (100A)) is as follows. Upon receiving the request from the VAL user to cancel the location information trigger to another VAL user, the SLM-C generates the off-network location management message. In the off-network location management message, the SLM-C sets the message type IE to "LOCATION REPORTING TRIGGER CANCEL REQUEST", sets the originating VAL user ID IE to its own VAL user ID, sets the terminating VAL user ID IE to the VAL user ID the target VAL user, sets the message ID IE to the unique identify of this message, generates an application/vnd.3gpp.seal-location-info+xml MIME body and in the <location-info> root element: adds a <configuration> element which shall not include any child element, sets the Location Management Data IE to the application/vnd.3gpp.seal-location-info+xml MIME body, and sends the message as specified in scenario of sending message. Upon reception of the off-network location management message containing a message type IE set to "LOCATION REPORTING TRIGGER CANCEL RESPONSE"; the SLM-C sends the acknowledgement message as specified in scenario of sending acknowledgement.

Protocol aspects of the terminating client (i.e. UE-2 (100B)) is as follows. Upon reception of the off-network location management message containing a message type IE set to "LOCATION REPORTING TRIGGER CANCEL REQUEST", the SLM-C deletes the content of the <configuration> elements, stops the location reporting, generates the off-network location management message. In the off-network location management message, the SLM-C sets the message type IE to "LOCATION REPORTING TRIGGER CANCEL RESPONSE", sets the originating VAL user ID IE to its own VAL user ID, sets the terminating VAL user ID IE to the VAL user ID the originating VAL user, sets the message ID IE to the unique identify of this message, sets the Reply-to Message ID IE to the value of the message ID IE of the received message, and sends the message as specified in scenario of sending message.

FIG. 6 is a sequential diagram illustrating signaling between the first UE and the second UE for on-demand reporting of the location information of the second UE to the first UE, according to the embodiments as disclosed herein. The FIG. 6 illustrates the proposed procedure for on-demand location report from the location management client controller (110A) residing in the UE-1 (100A) to the location management client controller (110B) residing in the UE-2 (100B). The UE-1 (100A) and the UE-2 (100B) are within the PC5 communication range of each other, and aware of the Layer-2 ID of each other. The VAL service user in the UE-1 (100A) is authorized to request the location report from the UE-2 (100B). The VAL service user in the UE-1 (100A) requests immediate location reporting to the UE-2 (100B). At 601, the location management client controller (110A) initiates the immediately request location information from the location management client controller (110B) based on the configuration such as the periodical location information timer by sending the off-network location request message to the location management client controller (110B). The off-network location request message includes information elements as specified in table 7.

TABLE 7

| Information element | Status | Description |
| --- | --- | --- |
| Identity | M | Identity of the VAL user to which the location request is targeted or identity of the VAL UE. |
| Message ID | M | Identity of the message; unique between pair of location management client controllers. |
| Requested location information | M | Identifies what location information is requested |

At 602, the VAL user or the VAL UE is notified and asked about the permission to share its location. The VAL user can accept or deny the request. At 603, the location management client controller (110B) immediately responds to the location management client controller (110A) with the off-network location response message. If permission is received from the VAL user, the location management client controller (110B) includes the off-network location response message containing the location information identified by the location management client controller (110A) and available to the location management client controller (110B). The off-network location response message includes information elements as specified in table 8.

TABLE 8

| Information element | Status | Description |
| --- | --- | --- |
| Result | M | Indicates the success or failure for the operation |
| Message ID | M | Identity of this message; unique between pair of location management client controllers. |
| Reply-to Message ID | M | Identity of the request message for which this response message is sent |
| Location information | M | Location information |

Upon receiving the off-network location response message, the location management client controller (110A) sends the off-network location management ACK message to the location management client controller (110B). The off-network location management ACK message includes the information elements as specified in the table 3. The off-network location response message acts as the acknowledgement to the location management client controller (110A). In an embodiment, the device (100B) sending the off-network location response message may indicate to avoid sending the acknowledgement for this message. In another embodiment, sending the acknowledgement to the off-network location response message is optional.

Protocol aspects of the originating client (i.e. UE-1 (100A)) is as follows. Upon receiving the request from the VAL user to request the off-network location information from another VAL user, the SLM-C generates the off-network location management message. In the off-network location management message, the SLM-C sets the message type IE to "ON-DEMAND LOCATION REQUEST", sets the originating VAL user ID IE to its own VAL user ID, sets the terminating VAL user ID IE to the VAL user ID the target VAL user, sets the message ID IE to the unique identify of this message, generates an application/vnd.3gpp.seal-location-info+xml MIME body and in the <location-info> root element. In a <report-request> element the SLM-C adds at least one of an <immediate-report-indicator> child element to indicate that an immediate location report is required, the location reporting elements which are requested. The SLM-C sets the location management data IE to the application/vnd.3gpp.seal-location-info+xml MIME body, and sends the message as specified in scenario of sending message. Upon reception of the off-network location management message containing the message type IE set to "ON-DEMAND LOCATION RESPONSE", the SLM-C sends the acknowledgement message as specified in scenario of sending acknowledgment.

Protocol aspects of the terminating client (i.e. UE-2 (100B)) is as follows. Upon reception of off-network location management message containing the message type IE set to "ON-DEMAND LOCATION REQUEST", the SLM-C generates the off-network location management message. In the off-network location management message, the SLM-C sets the message type IE to "ON-DEMAND LOCATION RESPONSE", sets the Originating VAL user ID IE to its own VAL user ID, sets the Terminating VAL user ID IE to the VAL user ID the originating VAL user, sets the message ID IE to the unique identify of this message, sets the Reply-to message ID IE to the value of the message ID IE of the received message, and generates an ap-plication/vnd.3gpp.seal-location-info+xml MIME body and the <location-info> root element. In a <report> element and, if the report was triggered by a location request, then the SLM-C adds the <report-id> attribute set to the value of the <request-id> attribute in the received request. The <report> element includes a <trigger-id> child element set to the value of each <trigger-id> value of the triggers that have been met, and the location reporting elements corresponding to the triggers that have been met. The SLM-C adds sets the location management data IE to the application/vnd.3gpp.seal-location-info+xml MIME body, and sends the message as specified in scenario of sending message.

The following describes the SEAL Off-network Location Management (SLM) message functional definition and contents. The SLM message is used between location management client controllers of the UE-1 (100A) and UE-2 (100B) to send the request, the response or the acknowledgement. The message type IE identifies the request or the response or the acknowledgement. Contents of the SLM message is given in table 9. The message type is the off-network location management message, and the direction of sending the off-network location management message from one UE to other UE.

TABLE 9

| IEI | Information Element | Type/Reference | Presence | Format | Length |
|---|---|---|---|---|---|
| | Message type | Message type 5.2.2 | M | V | 1 |
| | Originating VAL user ID | VAL user ID 5.2.5 | M | LV-E | 3-x |
| | Terminating VAL user ID | VAL user ID 5.2.5 | M | LV-E | 3-x |
| | Message ID | Message ID 5.2.3 | M | V | 16 |
| X | Reply-to Message ID | Reply-to Message ID 5.2.4 | O | TV | 17 |
| Z | Location management data | Message data 5.2.6 | O | TLV-E | 4-x |
| A | Cause | Cause 5.2.7 | O | TLV-E | 3-x |

FIG. 7 illustrates an example of a field (i.e. a generic arrangement of the bit order), according to the embodiments as disclosed herein. A most significant bit of the field is marked as MSB, and a least significant bit of the field is marked as LSB. The LSB of the field is represented by a lowest numbered bit of a highest numbered octet of the field. When the field extends over more than one octet, the order of bit values progressively decreases as the octet number increases. Within protocols defined in the present disclosure, the message consists of the message type information element, and other information elements, as required.

FIG. 8 illustrates an organization of a signaling message, according to the embodiments as disclosed herein. Unless specified otherwise in the message descriptions of definitions, a particular information element shall not be present more than once in a given message. The sending entity shall set value of a spare bit to zero. The receiving entity shall ignore value of a spare bit. The sending entity shall not set a value of the information element to a reserved value. The receiving entity shall discard message containing an information element set to a reserved value. The value part of the message type information element is given in table 10. The purpose of the message type information element is to identify the type of the message. The message type information element is a type 3 information element with a length of 1 octet. All values other than the values given in the table 10 are reserved.

TABLE 10

| | | | Bits | | | | | |
|---|---|---|---|---|---|---|---|---|
| 8 | 7 | 6 | 5 | 4 | 3 | 2 | 1 | Message |
| 0 | 0 | 0 | 0 | 0 | 0 | 0 | 1 | LOCATION REPORTING TRIGGER CONFIGURATION REQUEST |
| 0 | 0 | 0 | 0 | 0 | 0 | 1 | 0 | LOCATION REPORTING TRIGGER CONFIGURATION RESPONSE |
| 0 | 0 | 0 | 0 | 0 | 0 | 1 | 1 | LOCATION MANAGEMENT ACK |
| 0 | 0 | 0 | 0 | 0 | 1 | 0 | 0 | LOCATION REPORT |
| 0 | 0 | 0 | 0 | 0 | 1 | 0 | 1 | LOCATION REPORTING TRIGGER CANCEL REQUEST |
| 0 | 0 | 0 | 0 | 0 | 1 | 1 | 0 | LOCATION REPORTING TRIGGER CANCEL RESPONSE |

TABLE 10-continued

| | | | Bits | | | | | |
|---|---|---|---|---|---|---|---|---|
| 8 | 7 | 6 | 5 | 4 | 3 | 2 | 1 | Message |
| 0 | 0 | 0 | 0 | 0 | 1 | 1 | 1 | ON-DEMAND LOCATION REQUEST |
| 0 | 0 | 0 | 0 | 1 | 0 | 0 | 0 | ON-DEMAND LOCATION RESPONSE |

FIG. 9 illustrates a coded message ID information element, according to the embodiments as disclosed herein. The message ID information element uniquely identifies the message. The message ID information element is given in table 11 and shown in the FIG. 9. The message ID information element is a type 3 information element with a length of 16 octets.

TABLE 11

Message ID value (octet 1 to 16):
The message ID contains a number uniquely identifying a message. The value is a universally unique identifier as specified in IETF RFC 4122.

FIG. 10 illustrates a coded Reply-to message ID information element, according to the embodiments as disclosed herein. The Reply-to message ID information element is used to associate a message within a conversation that is a reply to an existing message in a conversation. The Reply-to message ID information element is given in table 12 and shown in the FIG. 10. The Reply-to message ID information element is a type 3 information element with a length of 17 octets.

TABLE 12

Reply-to message ID value (octet 2 to 17):
The Reply-to message ID contains a number uniquely identifying a message. The value is a universally unique identifier as specified in IETF RFC 4122.

FIG. 11 illustrates a coded VAL user ID information element, according to the embodiments as disclosed herein. The VAL user ID information element is used to indicate a VAL user ID. The VAL user ID information element is given in table 13 and shown in the FIG. 11. The VAL user ID information element is a type 6 information element.

TABLE 13

VAL user ID is contained in octet 3 to octet n; Max value of 65535 octets.

FIG. 12 illustrates a coded message data information element, according to the embodiments as disclosed herein. The message data information element is used to send message specific data based on the message type IE. The message data information element is given in table 14 and shown in the FIG. 12. The Message data information element is a type 6 information element. The message data information element contains the seal-location-info+xml as defined in 3GPP TS 24.545.

TABLE 14

Message data is contained in octet 4 to octet n; Max value of 65535 octets.

FIG. 13 illustrates a coded cause element, according to the embodiments as disclosed herein. The cause information element is used to provide short cause of the failure. The cause information element is given in table 15 and shown in the FIG. 13. The cause information element is a type 6 information element.

TABLE 15

Message data is contained in octet 3 to octet n; Max value of 127 octets.

FIG. 14 illustrates a coded acknowledgement required, according to the embodiments as disclosed herein. The purpose of the acknowledgement required information element is to indicate to the recipient of the message that the message originator is expecting acknowledgement of the message. The Acknowledgement required is a type 2 information element.

FIG. 15 illustrates a method of setting a timer to decide a success or failure of sending a message between UEs, according to the embodiments as disclosed herein. FIG. 5 illustrates an overview of main states and transitions on the UE (100) for sending the SEAL off-network location management messages. The start state exists for the SLM-C, when the SLM-C decides to send the SEAL off-network location management message. When the SLM-C sends the SEAL off-network location management message for which the response or the acknowledgement from the target UE is expected, the SLM-C sets the counter CX01 to the value 1, starts the timer TX01 (waiting for ack/resp), sends the message to the target UE, and enters the state "Waiting for Ack/Resp". If the device sending the message has requested to avoid sending acknowledge message, then the device will directly enter the state "Stop". 'Waiting for Response/ACK' state exists for the SLM-C, when the SLM-C has already sent the SEAL off-network location management message, and waiting to receive the response or the acknowledgement.

Upon expiry of the timer TX01 where the current value of the counter CX01 is less than N, the SLM-C increments the value of the counter CX01 by 1, restarts the timer TX01 (waiting for ack/resp), sends the message to the target UE; and remains in the state "Waiting for Response/ACK". Upon expiry of the timer TX01 where the current value of the counter CX01 is greater than or equal to N, the SLM-C considers the message sending as failure, stops the timer TX01 (waiting for Response/ACK), informs the VAL user about the failure of the message, and enters the state "Stop". Upon receiving the response of the message or the acknowledgement of the message, the SLM-C stops the timer TX01 (waiting for Response/ACK), and enter the state "Stop".

The 'Stop' state exists for the SLM-C, when the procedure to send the SEAL off-network location management message is completed, and no further response or acknowledgement is expected. The procedure to send the location management acknowledgement is as follows. The SLM-C generates the off-network location management message. In the off-network location management message, the SLM-C sets the message type IE to "LOCATION MANAGEMENT ACK", sets the originating VAL user ID IE to its own VAL user ID, sets the terminating VAL user ID IE to the VAL user ID the target VAL user, and sets the message ID IE to the value of the message ID IE of the received message, and sends the message as specified in scenario of sending message.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a first User Equipment (UE) for location management in off-network, the method comprises:
    sending, to a second UE, an off-network location reporting trigger configuration message comprising an off-network location reporting trigger configuration, wherein the off-network location reporting trigger configuration comprises at least one of an identity of the second UE or a user of the second UE, an identity of the off-network location reporting trigger configuration message, requested location information, and a list of triggering criteria;
    receiving, from the second UE, an off-network location reporting trigger configuration response message from the second UE; and
    sending, to the second UE, an off-network location management Acknowledgment (ACK) message.

2. The method as claimed in claim 1, wherein the off-network location reporting trigger configuration further comprises at least one of a minimum time between consecutive reports, or a life time of the configuration.

3. The method as claimed in claim 1, wherein the off-network location reporting trigger configuration response message comprises at least one of a result indicating a success or a failure for an operation, or a cause indicating a reason for the failure.

4. The method as claimed in claim 1,
    wherein the first UE and the second UE are within a PC5 communication range of each other, and aware of a Layer-2 Identifier (ID) of each other,
    wherein a Vertical Application Layer (VAL) service user of the first UE is authorized to configure a location reporting trigger to the second UE, and
    wherein the VAL service user of the first UE requests to configure the location reporting triggers to the second UE.

5. A method performed by a second User Equipment (UE) for location management in off-network, the method comprises:
    receiving, from a first UE, an off-network location reporting trigger configuration message comprising an off-network location reporting trigger configuration, wherein the off-network location reporting trigger configuration comprises at least one of an identity of the second UE or a user of the second UE, an identity of the off-network location reporting trigger configuration message, requested location information, and a list of triggering criteria;
    storing the off-network location reporting trigger configuration to a memory;
    sending, to the first UE, an off-network location reporting trigger configuration response message; and
    receiving, from the first UE, an off-network location management Acknowledgment (ACK) message.

6. The method as claimed in claim 5, wherein the off-network location reporting trigger configuration further comprises at least one of a minimum time between consecutive reports, or a life time of the configuration.

7. The method as claimed in claim 5, wherein the off-network location reporting trigger configuration response message comprises at least one of a result indicating a success or a failure for an operation, or a cause indicating a reason for the failure.

8. The method as claimed in claim 5,
    wherein the first UE and the second UE are within a PC5 communication range of each other, and aware of a Layer-2 Identifier (ID) of each other,
    wherein a Vertical Application Layer (VAL) service user of the first UE is authorized to configure a location reporting trigger to the second UE, and
    wherein the VAL service user of the first UE requests to configure the location reporting triggers to the second UE.

9. A first User Equipment (UE) for location management in off-network, comprises:
    a memory;
    a processor; and
    a location management client controller, operably coupled to the memory and the processor, configured for:
        sending, to a second UE, an off-network location reporting trigger configuration message comprising an off-network location reporting trigger configuration, wherein the off-network location reporting trigger configuration comprises at least one of an identity of the second UE or a user of the second UE, an identity of the off-network location reporting trigger configuration message, requested location information, and a list of triggering criteria,
        receiving, from the second UE, an off-network location reporting trigger configuration response message, and
        sending, to the second UE, an off-network location management Acknowledgment (ACK) message.

10. The first UE as claimed in claim 9, wherein the off-network location reporting trigger configuration further comprises at least one of a minimum time between consecutive reports, or a life time of the configuration.

11. The first UE as claimed in claim 9, wherein the off-network location reporting trigger configuration response message comprises at least one of a result indicating a success or a failure for an operation, or a cause indicating a reason for the failure.

12. The first UE as claimed in claim 9,
    wherein the first UE and the second UE are within a PC5 communication range of each other, and aware of a Layer-2 Identifier (ID) of each other,
    wherein a Vertical Application Layer (VAL) service user of the first UE is authorized to configure a location reporting trigger to the second UE, and wherein the VAL service user of the first UE requests to configure the location reporting triggers to the second UE.

13. A second User Equipment (UE) for location management in off-network, comprises:

a memory;

a processor; and a location management client controller, operably coupled to the memory and the processor, configured for:

receiving, from a first UE, an off-network location reporting trigger configuration message comprising an off-network location reporting trigger configuration, wherein the off-network location reporting trigger configuration comprises at least one of an identity of the second UE or a user of the second UE, an identity of the off-network location reporting trigger configuration message, requested location information, and a list of triggering criteria, storing the off-network location reporting trigger configuration to the memory, sending, to the first UE, an off-network location reporting trigger configuration response message, receiving, from the first UE, an off-network location management Acknowledgment (ACK) message.

14. The second UE as claimed in claim 13, wherein the off-network location reporting trigger configuration comprises at least one of a minimum time between consecutive reports, or a life time of the configuration, and wherein the off-network location reporting trigger configuration response message comprises at least one of a result indicating a success or a failure for an operation, or a cause indicating a reason for the failure.

15. The second UE as claimed in claim 13, wherein the first UE and the second UE are within a PC5 communication range of each other, and aware of a Layer-2 Identifier (ID) of each other, wherein a Vertical Application Layer (VAL) service user of the first UE is authorized to configure a location reporting trigger to the second UE, and wherein the VAL service user of the first UE requests to configure the location reporting triggers to the second UE.

* * * * *